(12) United States Patent
Aoki

(10) Patent No.: US 9,984,483 B2
(45) Date of Patent: May 29, 2018

(54) MOBILE TERMINAL TESTING DEVICE AND MOBILE TERMINAL TESTING METHOD

(71) Applicant: ANRITSU CORPORATION, Kanagawa (JP)

(72) Inventor: Kazunori Aoki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 94 days.

(21) Appl. No.: 14/949,339

(22) Filed: Nov. 23, 2015

(65) Prior Publication Data

US 2016/0171730 A1 Jun. 16, 2016

(30) Foreign Application Priority Data

Dec. 16, 2014 (JP) ................................. 2014-254136

(51) Int. Cl.
*G06T 11/20* (2006.01)
*H04B 10/07* (2013.01)

(52) U.S. Cl.
CPC ............ *G06T 11/206* (2013.01); *H04B 10/07* (2013.01)

(58) Field of Classification Search
None
See application file for complete search history.

(56) References Cited

U.S. PATENT DOCUMENTS

| 6,069,691 | A | * | 5/2000 | Rosow | G01M 11/00 356/124.5 |
| 7,002,580 | B1 | * | 2/2006 | Aggala | G06T 11/206 345/440 |
| 8,610,722 | B2 | * | 12/2013 | Boda | G06F 9/4443 345/473 |
| 8,660,869 | B2 | * | 2/2014 | MacIntyre | G06F 17/30536 705/1.1 |

FOREIGN PATENT DOCUMENTS

| JP | 2005331300 A | 12/2005 |
| JP | 2012-018195 A | 1/2012 |
| JP | 2012018195 A | 1/2012 |

* cited by examiner

*Primary Examiner* — Said Broome
(74) *Attorney, Agent, or Firm* — Pearne & Gordon LLP

(57) ABSTRACT

Provided are a mobile terminal testing device for and a mobile terminal testing method of enabling a user to easily recognize a change in the testing result data in each domain in a case where testing result data indicating a result of testing a mobile terminal is displayed with two domains. A three-dimensional display screen 40 on which the testing result data indicating a result of testing the mobile terminal is displayed in a three-dimensional graph that uses the first domain and the second domain, a first display screen 41 on which the testing result data is displayed in a graph that uses the first domain, and a second display screen 42 on which the testing result data is displayed in a graph that uses the second domain are displayed on a display device.

16 Claims, 5 Drawing Sheets

MOBILE TERMINAL TESTING DEVICE AND MOBILE TERMINAL TESTING METHOD

TECHNICAL FIELD

The present invention relates to a mobile terminal testing device for and a mobile terminal testing method for performing testing of a mobile terminal.

BACKGROUND ART

In the related art, as in Patent Document 1, a technology is proposed that displays testing result data indicating a result of testing a mobile terminal in a two-dimensional graph.

RELATED ART DOCUMENT

Patent Document

[Patent Document 1] Japanese Unexamined Patent Application Publication No. 2012-18195

DISCLOSURE OF THE INVENTION

Problem that the Invention is to Solve

However, because the technology in the related art displays the testing result data indicating the result of testing the mobile terminal in a two-dimensional graph in a frequency domain, it is difficult for a user to recognize a change in a time domain for the testing result data.

In this manner, in a case where the testing result data indicating the result of testing the mobile terminal is displayed in two domains, a problem with the technology in the related art is that it is difficult for the user to recognize a change in the testing result data in each domain.

An object of the present invention is to provide a mobile terminal testing device for and a mobile terminal testing method of enabling a user to easily recognize a change in the testing result data in each domain in a case where testing result data indicating a result of testing a mobile terminal is displayed with two domains.

Means for Solving the Problem

According to an aspect of the present invention, there is provided a mobile terminal testing device that is configured to include: a testing performing unit (11) that performs testing of a mobile terminal (2) based on testing information for performing the testing of the mobile terminal; a display control unit (24) that graph-displays testing result data indicating a result of the testing that is performed by the testing performing unit on a display device (21); and a marker setting unit (30) that sets a marker that specifies a position on the graph, in which the display control unit is configured to be set to display on the display device a three-dimensional display screen (40) on which the testing result data is displayed in a three-dimensional graph that uses a first domain and a second domain, a first display screen (41) on which the testing result data is displayed in a graph that uses the first domain, and a second display screen (42) on which the testing result data is displayed in a graph that uses the second domain, in which the display control unit is configured to display a graph showing the testing result data corresponding to a position that is specified by a second marker (47) which specifies a position on the second domain that is set by the marker setting unit, on the first display screen, with the first domain, and in which the display control unit displays a graph showing the testing result data corresponding to a position that is specified by a first marker (46) which specifies a position on the first domain that is set by the marker setting unit, on the second display screen, with the second domain.

With this configuration, the mobile terminal testing device according to the present invention displays on the display device the three-dimensional display screen on which the testing result data indicating the result of testing the mobile terminal is displayed in the three-dimensional graph that uses the first domain and the second domain, the first display screen on which the testing result data is displayed in the graph that is displayed with the first domain, and the second display screen on which the testing result data is displayed in the graph that is displayed with the second domain.

Additionally, the mobile terminal testing device according to the present invention displays on the first display screen the graph showing the testing result data corresponding to a position that is specified by the second marker, using the first domain, and displays on the second display screen the graph showing the testing result data corresponding to a position that is specified by the first marker, using the second domain.

Therefore, in a case where the testing result data indicating the result of testing the mobile terminal is displayed with two domains, the mobile terminal testing device according to the present invention can enable a user to easily recognize a change in the testing result data in each domain.

Furthermore, the mobile terminal testing device according to the present invention may further include a one-dimensional range setting unit (31) that sets a range of the first domain, in which the display control unit may further display on the second display screen a graph showing statistical data in the first domain for the testing result data corresponding to a range (50) that is set by the one-dimensional range setting unit.

With this configuration, the mobile terminal testing device according to the present invention can enable the user to recognize a statistical feature of the second domain in a setting range of the first domain, because a range of the first domain is set, and the graph showing the statistical data in the first domain for the testing result data corresponding to the range that is set is further displayed on the second display screen.

Furthermore, the mobile terminal testing device according to the present invention further may include: a one-dimensional range setting unit (31) that sets a range of the second domain, in which the display control unit may further display on the first display screen a graph showing statistical data in the second domain for the testing result data corresponding to a range (50) that is set by the one-dimensional range setting unit.

With this configuration, the mobile terminal testing device according to the present invention can enable the user to recognize a statistical feature of the first domain in a setting range of the second domain, because the range of the second domain is set, and the graph showing the statistical data in the second domain for the testing result data corresponding to the range that is set is further displayed on the first display screen.

Furthermore, the mobile terminal testing device according to the present invention may further include a feature point detection unit (32) that detects a feature point of the testing result data, in which the marker setting unit may set the first marker and the second marker to be at positions that correspond to the feature point that is detected by the feature point detection unit.

With this configuration, the mobile terminal testing device according to the present invention can display a graph including the feature point on the first display screen and the second display screen, saving the user the trouble of searching for the feature point such as a peak in the testing result data while moving display positions of the first domain and the second domain, because the feature point of the testing result data is detected and the first marker and the second marker are set to be at positions that correspond to the detected feature point.

Furthermore, the mobile terminal testing device according to the present invention may further include a two-dimensional range setting unit (33) that sets a range of the first domain and a range of the second domain, in which the feature point detection unit may detect the feature point from within a range that is set by the two-dimensional range setting unit.

With this configuration, the mobile terminal testing device according to the present invention can display a graph including the feature point within a setting range on the first display screen and the second display screen, saving the user the trouble of searching for the feature point such as the peak in the testing result data while moving display the positions of the first domain and the second domain, because the range of the first domain and the range of the second domain are set, the feature point of the testing result data is detected from within the range that is set, and the first marker and the second marker are set to be at the positions that correspond to the detected feature point.

Furthermore, in the mobile terminal testing device according to the present invention, the second domain may be a time domain.

With this configuration, the mobile terminal testing device according to the present invention can enable the user to easily recognize a change in the testing result data in the first domain over time by setting the second domain to be the time domain.

Furthermore, in the mobile terminal testing device according to the present invention, the display control unit may display the first display screen and the second display screen on the display device, in a state of being arranged side by side.

With this configuration, in a case where the testing result data indicating the result of testing the mobile terminal is displayed with two domains, the user can be enabled to easily recognize the change in the testing result data in each domain.

According to another aspect of the present invention, there is provided a mobile terminal testing method in which a mobile terminal testing device performs testing of a mobile terminal (2) based on testing information for performing the testing of the mobile terminal, the mobile terminal testing method including: a display control step of displaying on a display device (21) a three-dimensional display screen (40) on which testing result data showing a result of testing the mobile terminal is displayed in a three-dimensional graph that uses a first domain and a second domain, a first display screen (41) on which the testing result data is displayed in a graph that uses the first domain, and a second display screen (42) on which the testing result data is displayed in a graph that uses the second domain; and a marker setting step of setting a first marker (46) that specifies a position on the first domain and setting a second marker (47) that specifies a position on the second domain, in which, in the display control step, a graph showing the testing result data corresponding to the position that is specified by the second marker is displayed on the first display screen, with the first domain, and a graph showing the testing result data corresponding to the position that is specified by the first marker is displayed on the second display screen, with the second domain.

In this manner, in the mobile terminal testing method according to the present invention, the three-dimensional display screen on which the testing result data indicating the result of testing the mobile terminal is displayed in the three-dimensional graph that uses the first domain and the second domain, the first display screen on which the testing result data is displayed in the graph that is displayed with the first domain, and the second display screen on which the testing result data is displayed in the graph that is displayed with the second domain are displayed on the display device.

Additionally, in the mobile terminal testing method according to the present invention, the graph showing the testing result data corresponding to a position that is specified by the second marker is displayed on the first display screen, using the first domain, and the graph showing the testing result data corresponding to a position that is specified by the first marker, is displayed on the second display screen, using the second domain.

Therefore, in the mobile terminal testing method according to the present invention, in the case where the testing result data indicating the result of testing the mobile terminal is displayed with two domains, the user can be enabled to easily recognize the change in the testing result data in each domain.

Furthermore, in the mobile terminal testing method according to the present invention, the mobile terminal testing device may include a one-dimensional range setting unit (31) that sets a range of the first domain, and, in the display control step, a graph showing statistical data in the first domain for the testing result data corresponding to a range that is set by the one-dimensional range setting unit may further be displayed on the second display screen.

With this configuration, in the mobile terminal testing method according to the present invention, the user can be enabled to recognize the statistical feature of the second domain in the setting range of the first domain, because the range of the first domain is set, and the graph showing the statistical data in the first domain of the testing result data corresponding to the range that is set is further displayed on the second display screen.

Furthermore, in the mobile terminal testing method according to the present invention, the mobile terminal testing device may include a one-dimensional range setting unit (31) that sets a range of the second domain, and, in the display control step, a graph showing statistical data in the second domain for the testing result data corresponding to a range that is set by the one-dimensional range setting unit may further be displayed on the first display screen.

With this configuration, in the mobile terminal testing method according to the present invention, the user can be enabled recognize a statistical feature of the first domain in the setting range of the second domain, because the range of the second domain is set, and the graph showing the statistical data in the second domain of the testing result data corresponding to the range that is set is further displayed on the first display screen.

Furthermore, in the mobile terminal testing method according to the present invention, the mobile terminal testing device may include a feature point detection unit (32) that detects a feature point of the testing result data, and, in the marker setting step, the first marker and the second marker may be set to be at positions that correspond to the feature point which is detected by the feature point detection unit.

With this configuration, in the mobile terminal testing method according to the present invention, the feature point of the testing result data is detected and the first marker and the second marker are set to be at positions that correspond to the detected feature point. Because of this, a graph including the feature point can be displayed on the first display screen and the second display screen, saving the user the trouble of searching for the feature point such as the peak in the testing result data while moving display positions of the first domain and the second domain.

Furthermore, in the mobile terminal testing method according to the present invention, the mobile terminal testing device may further include a two-dimensional range setting unit (33) that sets a range of the first domain and a range of the second domain, and the feature point detection unit may detect the feature point from within the range that is set by the two-dimensional range setting unit.

With this configuration, in the mobile terminal testing method according to the present invention, the range of the first domain and the range of the second domain are set, the feature point is detected within the ranges that are set, and the first marker and the second marker are set to be at the positions that correspond to the detected feature point. Because of this, the graph including the feature point within the setting ranges can be displayed on the first display screen and the second display screen, saving the user the trouble of searching for the feature point such as the peak in the testing result data while moving display positions of the first domain and the second domain.

Furthermore, in the mobile terminal testing method according to the present invention, the second domain may be a time domain.

With this configuration, in the mobile terminal testing method according to the present invention, by setting the second domain to be the time domain, the user can be enabled to easily recognize a change in the testing result data in the first domain over time.

Furthermore, in the mobile terminal testing method according to the present invention, in the display control step, the first display screen and the second display screen may be displayed on the display device in a state of being arranged side by side.

With this configuration, in a case where the testing result data indicating the result of testing the mobile terminal 2 is displayed with two domains, a user can be enabled to easily recognize a change in the testing result data in each domain.

Advantage of the Invention

According to the present invention, there can be provided a mobile terminal testing device for and a mobile terminal testing method of enabling a user to easily recognize a change in the testing result data in each domain in a case where testing result data indicating a result of testing a mobile terminal is displayed with two domains.

BEST MODE FOR CARRYING OUT THE INVENTION

Figure 1:
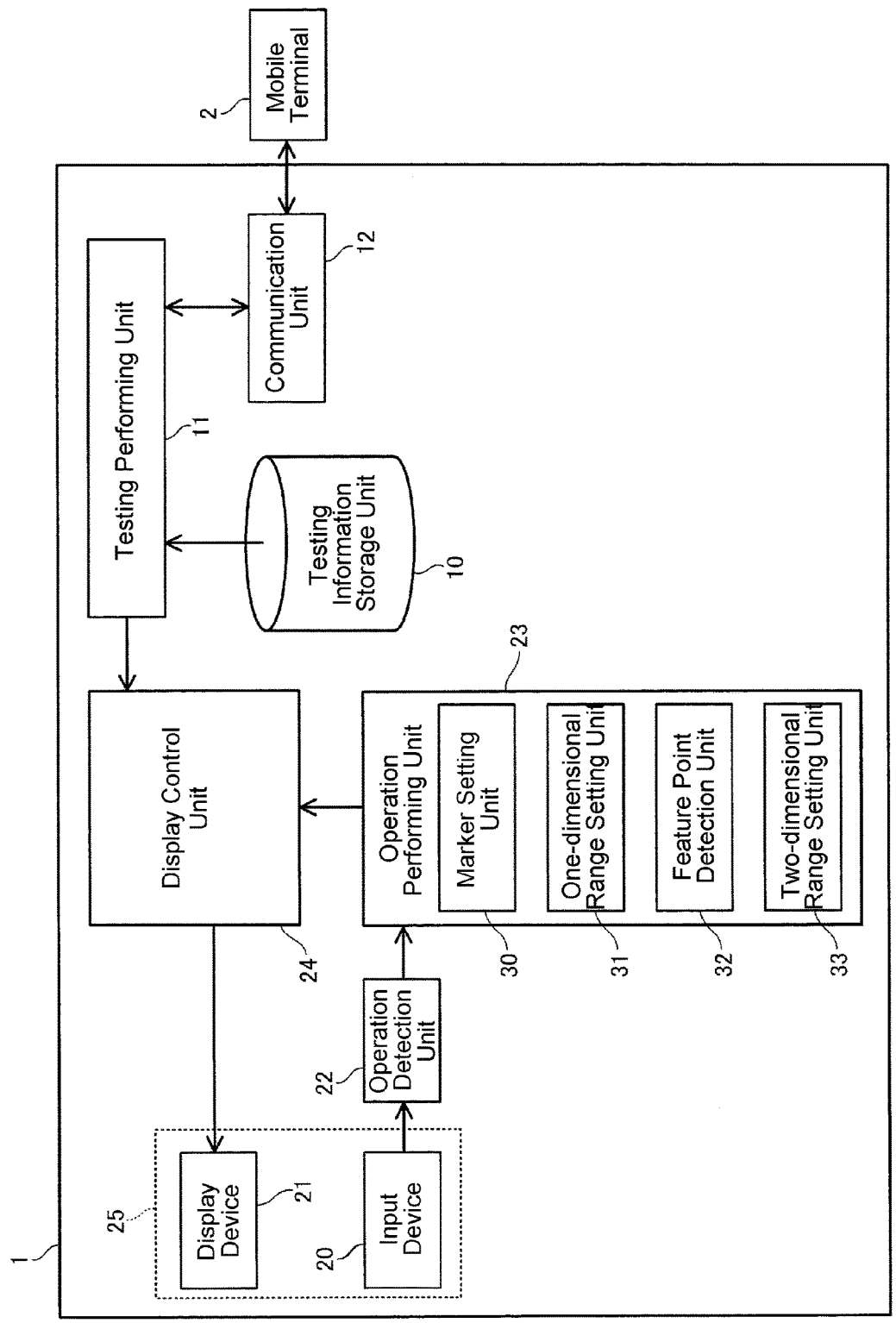
FIG. 1 is a block diagram of a mobile terminal testing device according to an embodiment of the present invention.

An embodiment of the present invention will be described below referring to the drawings.

As illustrated in FIG. 1, a mobile terminal testing device 1 is set to transmit and receive a signal to and from a mobile terminal 2 in a wired manner through a coaxial cable or the like. Moreover, the mobile terminal testing device 1 may be set to transmit and receive a signal to and from the mobile terminal 2 in a wireless manner through an antenna.

The mobile terminal testing device 1 is configured to include a testing information storage unit 10 in which testing information including scenarios and parameters for performing of testing of the mobile terminal 2 is stored, a testing performing unit 11 that performs the testing of the mobile terminal 2 based on the testing information that is stored in the testing information storage unit 10, and a communication unit 12 that performs communication with the mobile terminal 2 according to the testing that is performed by the testing performing unit 11.

Furthermore, the mobile terminal testing device 1 is configured to further include an input device 20 that is configured as a touchpad or the like, a display device 21 that is configured as a liquid crystal display or the like, an operation detection unit 22 that detects an operation which is caused by the input device 20, an operation performing unit 23 that performs processing according to the operation which is detected by the operation detection unit 22, and a display control unit 24 that controls the display device 21.

At this point, the mobile terminal testing device 1 is configured as a computer-like apparatus to which a communication module for communication with the mobile terminal 2 is provided, which is not illustrated. Such computer-like apparatus has a central processing unit (CPU), a read only memory (ROM), a random access memory (RAM), a hard disk drive, an input and output port, and a touch panel, all of which are not illustrated.

Stored in the ROM and the hard disk drive of the computer-like apparatus is a program for causing the computer-like apparatus to function as the mobile terminal testing device 1. That is, the computer-like apparatus functions as the mobile terminal testing device 1 by the CPU executing the program that is stored in the ROM with the RAM as a working area.

In this manner, the testing information storage unit 10 according to the present embodiment is configured as a RAM or a hard disk drive, the testing performing unit 11, the operation detection unit 22, the operation performing unit 23, and the display control unit 24 each are configured as a CPU, and communication 12a to 12e each are configured as a communication module.

Furthermore, the input device 20 and the display device 21 are integrally configured as a touch panel 25. That is, in addition to indicating information, an image that is displayed by the display control unit 24 on the display device 21 makes up the user interface for inputting information in cooperation with the input device 20.

Based on the testing information that is stored in the testing information storage unit 10, the testing performing unit 11 performs multiple types of testing on the mobile terminal 2, and pieces of testing result data indicating a result of each testing operation are set to be accumulated in the RAM or the hard disk drive.

Figure 2:
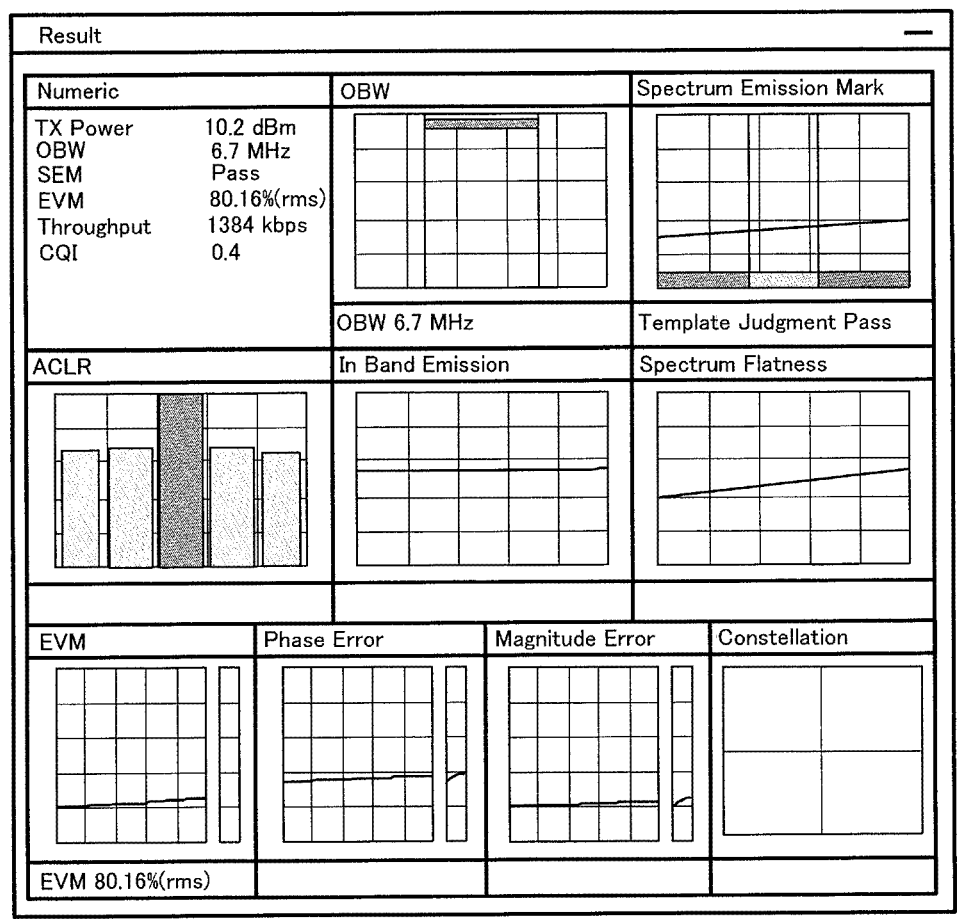
FIG. 2 is a diagram illustrating a sub-window that is displayed by the mobile terminal testing device according to the embodiment of the present invention.

The display control unit 24 is set to display an image on the display device 21 according to processing that is performed by the operation performing unit 23. For example, as illustrated in FIG. 2, the display control unit 24 is set to display on the display device 21 a main window on which to display the pieces of testing result data that are accumulated in the RAM or the hard disk drive.

At this point, among the pieces of testing result data indicating the result of the testing in compliance with Long Term Evolution (LTE) are statistical values as pieces of testing result data that are expressed in numerical values, such as transmission power (TX Power), an occupied bandwidth (OBW), a spectrum emission mask (SEM), modulation accuracy (error vector magnitude (EVM)), throughput, and reception quality (channel quality indicator (CQI)).

Furthermore, as the pieces of testing result data that are expressed two-dimensionally in indexes such as frequency domain, there are an OBW, a SEM, an adjacent channel leakage ratio (ACLR), in-bound emission, spectrum flatness, EVM, a phase error, a magnitude error, a signal space (constellation), and the like.

According to the present embodiment, when the operation detection unit 22 detects an operation of selecting a region on which testing result data that is displayed two-dimensionally is displayed, the operation performing unit 23 is set to display on the display control unit 24 a sub-window on which to display the testing result data in detail.

Figure 3:
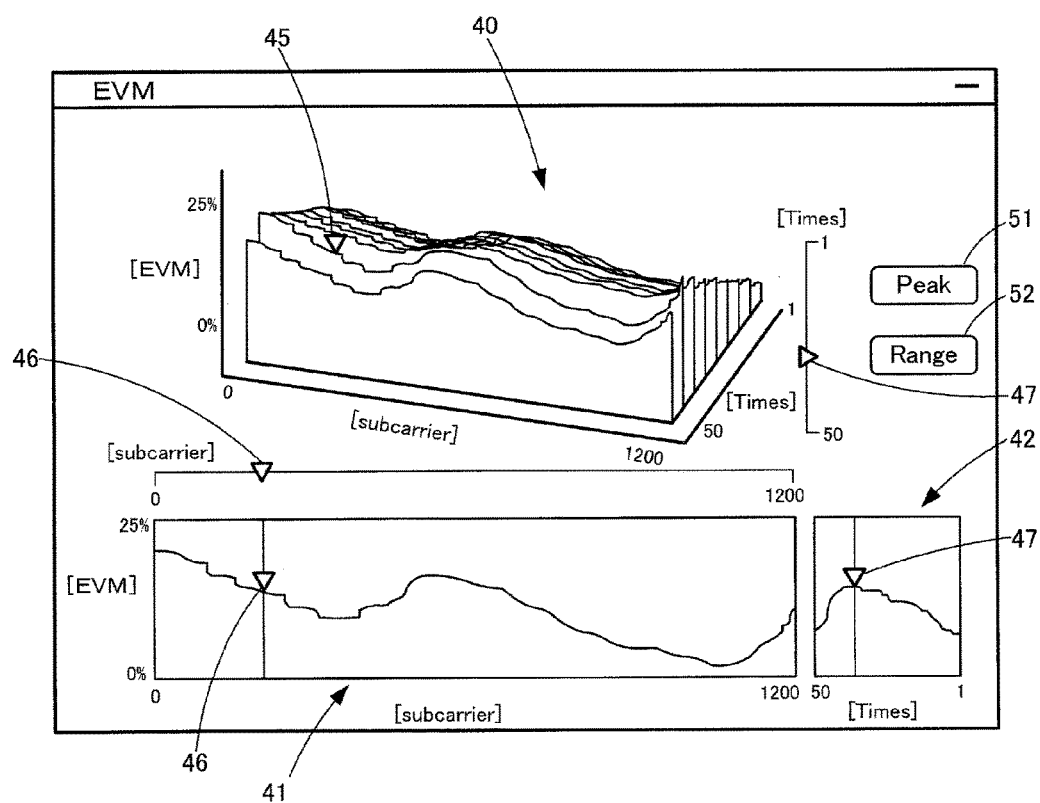
FIG. 3 is a diagram illustrating a main-window that is displayed by the mobile terminal testing device according to the embodiment of the present invention.

FIG. 3 illustrates a sub-window that is displayed in a case where a region, on which the EVM, the testing result data, on the main window is displayed, is selected. The display control unit 24 is set to display on the display device 21 a three-dimensional display screen 40 on which the testing result data is displayed in a three-dimensional graph that is displayed with a frequency (subcarrier) domain as a first domain and a time domain as a second domain, a first display screen 41 on which the testing result data is displayed in a graph that uses the frequency domain, and a second display screen 42 on which the testing result data is displayed in a graph that uses the time domain.

As illustrated in FIG. 1, the operation performing unit 23 has a marker setting unit 30 that sets a first marker 46 which specifies a position on the frequency domain and that sets a second marker 47 which specifies a position on the time domain.

Furthermore, the display control unit 24 is set to display on a corresponding position on the three-dimensional display screen 40 a marker 45 that is determined by the first marker 46 and the second marker 47 that are set by the marker setting unit 30.

Furthermore, the display control unit 24 is set to display on a corresponding position on the first display screen 41 the first marker 46 that is set by the marker setting unit 30. In the same manner, the display control unit 24 is set to display on a corresponding position on the second display screen 42 the second marker 47 that is set by the marker setting unit 30.

The display control unit 24 is set to display on the first display screen 41 a graph showing the testing result data corresponding to a position that is specified by the second marker 47, with the frequency domain, and to display on the second display screen 42 a graph showing the testing result data corresponding to a position that is specified by the first marker 46, with the second domain.

Therefore, when the first marker 46 that is displayed on the first display screen 41 is moved by the input device 20, a graph showing the testing result data for the time domain of a frequency corresponding to a position of the post-movement first marker 46 is displayed on the second display screen 42.

In the same manner, when the second marker 47 that is displayed by the input device 20 on the second display screen 42 is moved, a graph showing the testing result data for the frequency domain of time corresponding to a position of the post-movement second marker 47 is displayed on the first display screen 41.

Figure 4:
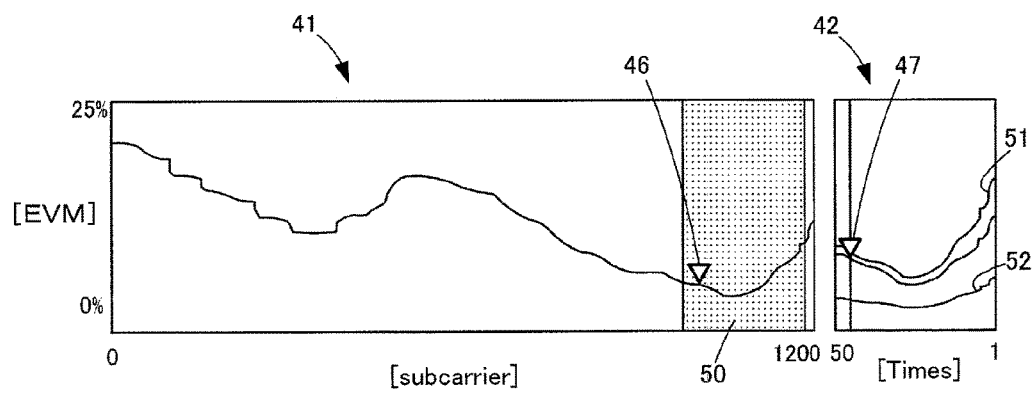
FIG. 4 is a diagram illustrating a first display screen and a second display screen in which a range of a frequency domain is set for the sub-window that is illustrated in FIG. 3.

As illustrated in FIG. 1, the operation performing unit 23 further has a one-dimensional range setting unit 31 that sets a range of the frequency domain. As illustrated in FIG. 4, the display control unit 24 is set to display on the second display screen 42 the graph showing the testing result data corresponding to the position that is specified by the first marker 46, and to further display on the second display screen 42 a graph showing statistical data in a corresponding frequency band within the frequency domain for the testing result data corresponding to a range 50 that is set by the one-dimensional range setting unit 31.

According to the present embodiment, the display control unit 24 is set to display on the second display screen 42 a graph 51 showing a maximum value and a graph 52 showing a minimum value in a corresponding frequency band, as the graph showing the statistical data in the range 50 that is set by the one-dimensional range setting unit 31.

As illustrated in FIG. 1, the operation performing unit 23 further has a feature point detection unit 32 that detects a feature point of the testing result data. The marker setting unit 30 is set to set the first marker 46 and the second marker 47 to be at a position corresponding to the feature point that is detected by the feature point detection unit 32.

Figure 5:
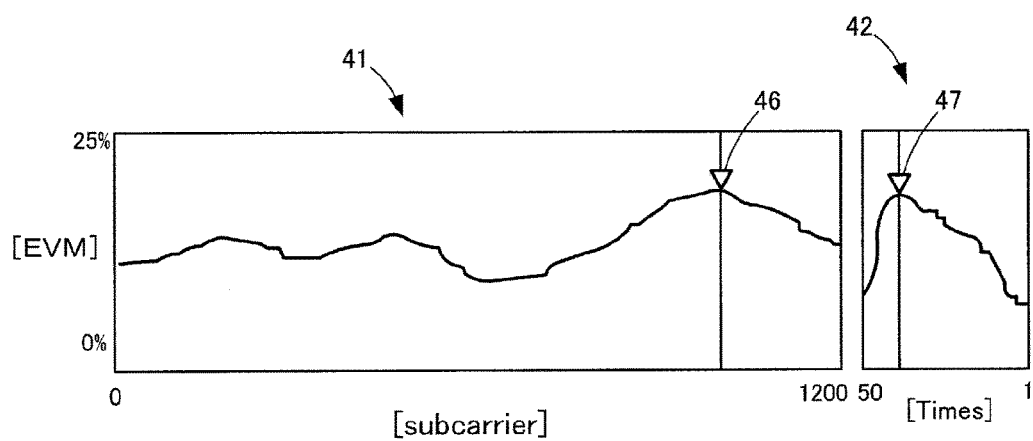
FIG. 5 is a diagram illustrating the first display screen and the second display screen on the sub-window that is illustrated in FIG. 3.

Specifically, the feature point detection unit 32 is set to detect a peak as the feature point of the testing result data. Therefore, by operating a peak button 51 (refer to FIG. 3) that is displayed within a sub-window, the feature point detection unit 32, as illustrated in FIG. 5, is set to set the first marker 46 and the second marker 47 to be at positions where the EVM is the poorest of the pieces of testing result data.

As illustrated in FIG. 1, the operation performing unit 23 further has a two-dimensional range setting unit 33 that sets a range of the first domain and a range of the second domain. According to the present embodiment, by operating a range button 52 (refer to FIG. 3) that is displayed within the sub-window, the display control unit 24 is set to display on the display device 21 a two-dimensional range setting window as illustrated in FIG. 6.

A lattice that indicates a resource element configuration in LTE and bands 60 and 61 that correspond to the first marker 46 and the second marker 47, respectively, are displayed on the two-dimensional range setting window. Moreover, in FIG. 6, a small number of resource elements are illustrated.

Figure 6:
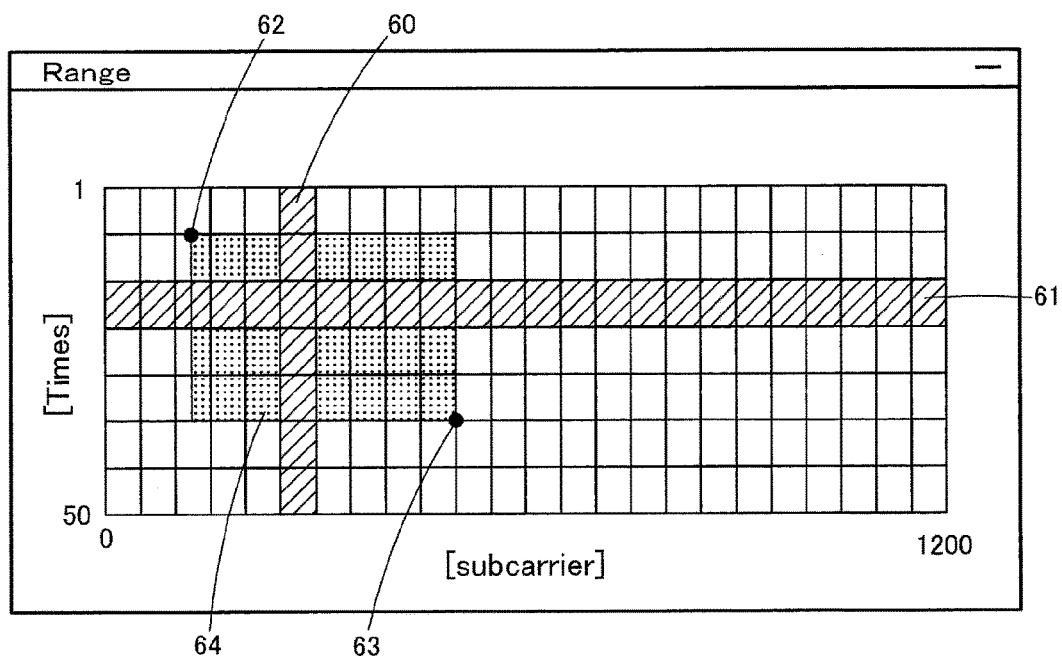
FIG. 6 is a diagram illustrating a two-dimensional range setting window that is displayed by the mobile terminal testing device according to the embodiment of the present invention.

When, in the two-dimensional range setting window illustrated in FIG. 6, the operation detection unit 22 detects that two buttons 62 and 63 are designated through the input device 20, the two-dimensional range setting unit 33 is set to specify a frequency band and a time band that are designated, and the feature point detection unit 32 is set to detect a feature point (for example, the "peak" described above), from the pieces of testing result data for a region 64 corresponding to the frequency band and the time band that are specified by the two-dimensional range setting unit 33. Furthermore, the marker setting unit 30 is set to set the first marker 46 and the second marker 47 to be at a position corresponding to the feature point that is detected by the feature point detection unit 32.

As illustrated above, according to the present embodiment, the three-dimensional display screen 40 on which the testing result data indicating a result of testing the mobile terminal 2 is displayed in a three-dimensional graph that uses the first domain and the second domain, the first display screen 41 on which the testing result data is displayed in a graph that uses the first domain, and the second display screen 42 on which the testing result data is displayed in a graph that uses the second domain are displayed on the display device 21.

Additionally, the graph showing the testing result data corresponding to a position that is specified by the second marker 47 is displayed on the first display screen 41, with the first domain, and the graph showing the testing result data corresponding to a position that is specified by the first marker 46, is displayed on the second display screen 42, with the second domain.

Therefore, according to the present embodiment, in a case where the testing result data indicating the result of testing the mobile terminal 2 is displayed with two domains, a user can be enabled to easily recognize a change in the testing result data in each domain.

Furthermore, according to the present embodiment, a range of the first domain is set, and the graph showing the statistical data in the first domain for the testing result data corresponding to the range that is set is further displayed on the second display screen 42. Because of this, the user can be enabled to recognize a statistical feature of the second domain in the setting range of the first domain.

Furthermore, according to the present embodiment, the feature point of the testing result data is detected and the first marker 46 and the second marker 47 are set to be at positions that correspond to the detected feature point. Because of this, a graph including the feature point can be displayed on the first display screen 41 and the second display screen 42, saving the user the trouble of searching for the feature point such as the peak in the testing result data while moving display positions of the first domain and the second domain.

Furthermore, according to the present embodiment, the range of the first domain and the range of the second domain are set, the feature point is detected within the ranges that are set, and the first marker 46 and the second marker 47 are set to be at the positions that correspond to the detected feature point. Because of this, the graph including the feature point within the setting ranges can be displayed on the first display screen 41 and the second display screen 42, saving the user the trouble of searching for the feature point such as the peak in the testing result data while moving display positions of the first domain and the second domain.

Furthermore, according to the present embodiment, by setting the second domain to be the time domain, the user can be enabled to easily recognize a change in the testing result data in the first domain over time.

Moreover, according to the present embodiment, setting of a display range, enlargement, reduction and resolution in each domain of the three-dimensional display screen 40 on the main window, the first display screen 41 that are illustrated in FIG. 3, and the second display screen 42 can be arbitrarily changed by providing a well-known interface.

According to the present embodiment, the two-dimensional range setting window that is illustrated in FIG. 6 can also be applied as a window for designating the display range in the three-dimensional display screen 40 on the main window, the first display screen 41, and the second display screen 42 that are illustrated in FIG. 3.

Furthermore, according to the present embodiment, as illustrated in FIG. 4, the statistical data in a corresponding frequency band corresponding to a setting range in the first display screen 41 is described as being displayed on the second display screen 42.

In contrast, according to the present embodiment, the statistical data in a time band corresponding to a setting range in the second display screen 42 is described as being displayed on the first display screen 41.

Furthermore, according to the present embodiment, there is provided a mobile terminal testing method in which the mobile terminal testing device 1 performs the testing of the mobile terminal 2 based on the testing information for performing the testing of the mobile terminal 2, the method including a display control step of displaying on the display device 21 the three-dimensional display screen 40 on which the testing result data indicating the result of testing the mobile terminal 2 is displayed in the three-dimensional graph that uses the frequency domain as the first domain and the time domain as the second domain, the first display screen 41 on which the testing result data is displayed in the graph that uses the frequency domain, and the second display screen 42 on which the testing result data is displayed in the graph that uses the time domain; and a marker setting step of setting the first marker 46 that specifies a position on the frequency domain and setting the second marker 47 that specifies a position on the time domain.

Then, in the display control step, the testing result data corresponding to the position that is specified by the second marker 47 is displayed on the first display screen 41, with the frequency domain, and the testing result data corresponding to the position that is specified by the first marker 46, is displayed on the second display screen 42, with the time domain.

Furthermore, in the display control step, the graph showing the statistical data in the frequency domain for the testing result data corresponding to the range that is set by the one-dimensional range setting unit 31 may be further displayed on the second display screen 42. Alternatively, in the display control step, the graph showing the statistical data in the time domain for the testing result data corresponding to the range that is set by the one-dimensional range setting unit 31 may be further displayed on the first display screen 41.

Furthermore, in the marker setting step, the first marker 46 and the second marker 47 may be set to be at the position corresponding to the feature point that is detected by the feature point detection unit 32.

Furthermore, in the marker setting step, the first marker and the second marker may be set to be at the position corresponding to the feature point that is detected by the feature point detection unit 32 from within the range that is set by the two-dimensional range setting unit 33.

Furthermore, in the display control step, the first display screen and the second display screen may be displayed on the display unit 21 in a state of being arranged side by side.

The embodiment of the present invention is disclosed above, and it is apparent to a person of ordinary skill in the art that modifications to the embodiment are possible within the scope that does not depart from the nature and gist of the present invention. Such modifications and equivalents are intended to fall within the scopes of claims.

DESCRIPTION OF REFERENCE NUMERALS AND SIGNS

1 MOBILE TERMINAL TESTING DEVICE
2 MOBILE TERMINAL
11 TESTING PERFORMING UNIT
21 DISPLAY DEVICE
24 DISPLAY CONTROL UNIT
30 MARKER SETTING UNIT
31 ONE-DIMENSIONAL RANGE SETTING UNIT
32 FEATURE POINT DETECTION UNIT
33 TWO-DIMENSIONAL RANGE SETTING UNIT
40 THREE-DIMENSIONAL DISPLAY SCREEN
41 FIRST DISPLAY SCREEN
42 SECOND DISPLAY SCREEN
46 FIRST MARKER
47 SECOND MARKER

What is claimed is:

1. A mobile terminal testing device comprising:
a display; and
at least one processor and memory configured to:
perform wireless communication standard compliance testing of a mobile terminal;
display testing result data on the display, the testing result data indicating a result of the performed testing,
wherein the displayed testing result data is displayed in the forms of a three-dimensional graph having first, second, and third dimensions, a first two-dimensional graph of the first and third dimensions, and a second two-dimensional graph of the second and third dimensions; and
set a first marker on the first two-dimensional graph, the first marker indicating a position on the first dimension, and set a second marker on the second two-dimensional graph, the second marker indicating a position on the second dimension,
wherein the first two dimensional graph illustrates the testing result data in the first and third dimensions at a position of the second dimension corresponding to the position of the second marker corresponding to the second dimension, and
wherein the second two-dimensional graph illustrates the testing result data in the second and third dimensions at a position of the first dimension corresponding to the position of the first marker corresponding to the first dimension.

2. The mobile terminal testing device according to claim 1, wherein the processor and memory are further configured to:
set a range of the first dimension, and
display the first two-dimensional graph according to the set range of the first dimension.

3. The mobile terminal testing device according to claim 1, wherein the processor and memory are further configured to:
set a range of the second dimension, and
display the second two-dimensional graph according to the set range of the second dimension.

4. The mobile terminal testing device according to claim 1, wherein the processor and memory are further configured to:
detect a feature point of the testing result data, and
set the first marker and the second marker to be at positions that correspond to the detected feature point.

5. The mobile terminal testing device according to claim 4, wherein the processor and memory are further configured to:
set a range of the first dimension and a range of the second dimension, and
detect the feature point from within the set ranges of the first and second dimensions.

6. The mobile terminal testing device according to claim 1, wherein the second dimension is a time dimension.

7. The mobile terminal testing device according to claim 1, wherein the processor and memory are further configured to display the first two-dimensional graph and the second two-dimensional graph on the display, in a side by side manner.

8. A mobile terminal testing method comprising:
performing wireless communication standard compliance testing of a mobile terminal;
displaying testing result data indicating a result of performed testing the mobile terminal, wherein the testing result data is displayed in the forms of a three-dimensional graph having first, second, and third dimensions, a first two-dimensional graph of the first and third dimensions, and a second two-dimensional graph of the second and third dimensions; and
setting a first marker on the first two-dimensional graph, the first marker indicating a position on the first dimension and setting a second marker on the second two-dimensional graph, the second marker indicating a position on the second dimension,
wherein, the first two-dimensional graph illustrates the testing result data in the first and third dimensions at a position of the second dimension corresponding to the position of the second marker corresponding to the second dimension, and
wherein the second two-dimensional graph illustrates the testing result data in the second and third dimensions at a position of the first dimension corresponding to the position of the first marker corresponding to the first dimension.

9. The mobile terminal testing method according to claim 8, further comprising setting a range of the first dimension,
wherein, the first two-dimensional graph is displayed according to the set range of the first dimension.

10. The mobile terminal testing method according to claim 8, further comprising setting a range of the second dimension,
wherein, the second two-dimensional graph is displayed according to the set range of the second dimension.

11. The mobile terminal testing method according to claim 8, further comprising detecting a feature point of the testing result data,
wherein, the first marker and the second marker are set to be at positions that correspond to the detected feature point.

12. The mobile terminal testing method according to claim 11, further comprising setting a range of the first dimension and setting a range of the second dimension,
wherein the feature point is detected from within the set ranges of the first and second dimensions.

13. The mobile terminal testing method according to claim 8, wherein the second dimension is a time dimension.

14. The mobile terminal testing method according to claim 8, wherein the first two-dimensional graph and the second two-dimensional graph are displayed side by side.

15. The mobile terminal testing device according to claim 1, wherein the wireless communication standard is a Long Term Evolution (LTE) standard.

16. The mobile terminal testing method according to claim 8, wherein the wireless communication standard is a Long Term Evolution (LTE) standard.

* * * * *